J. M. PARRY.
COMBINED HAY GATHERER AND LOADER.
APPLICATION FILED JULY 17, 1913.
1,115,732.
Patented Nov. 3, 1914.
2 SHEETS—SHEET 2.
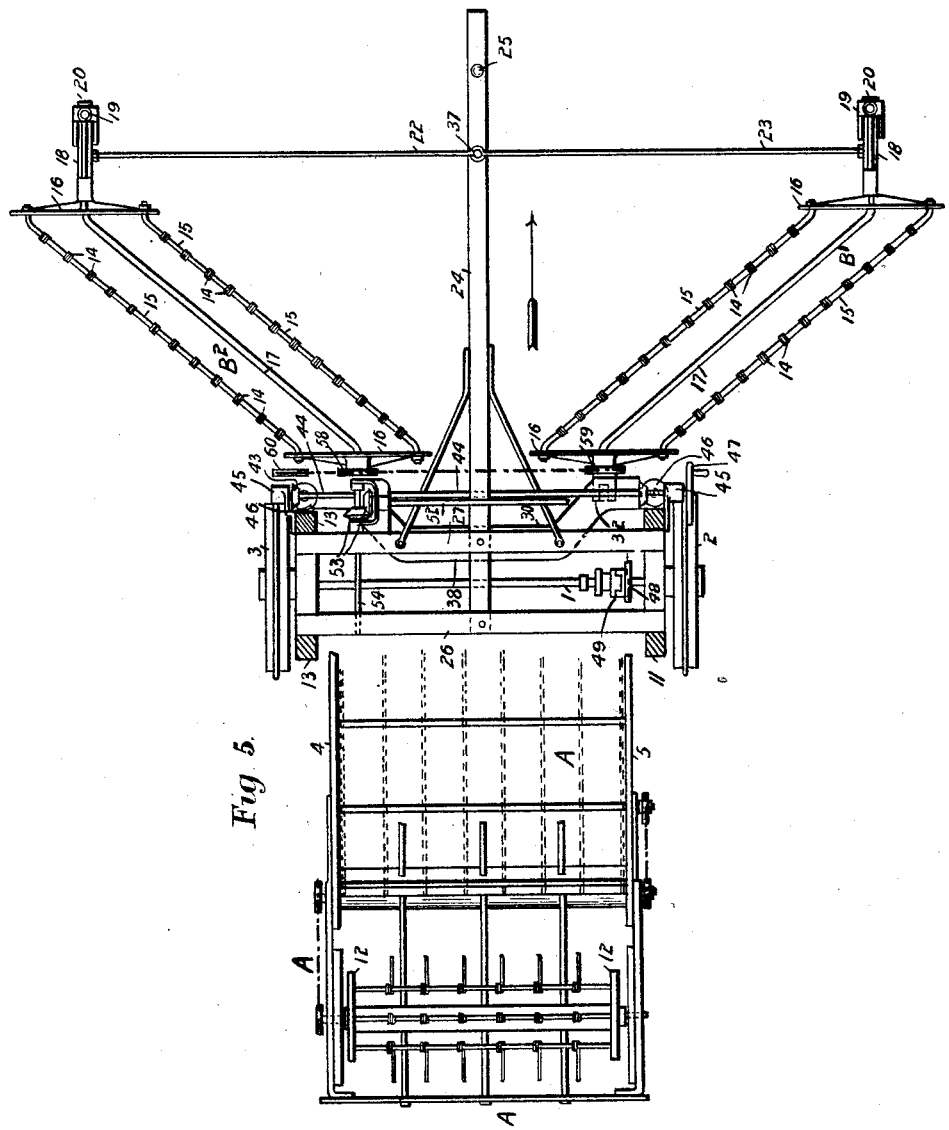

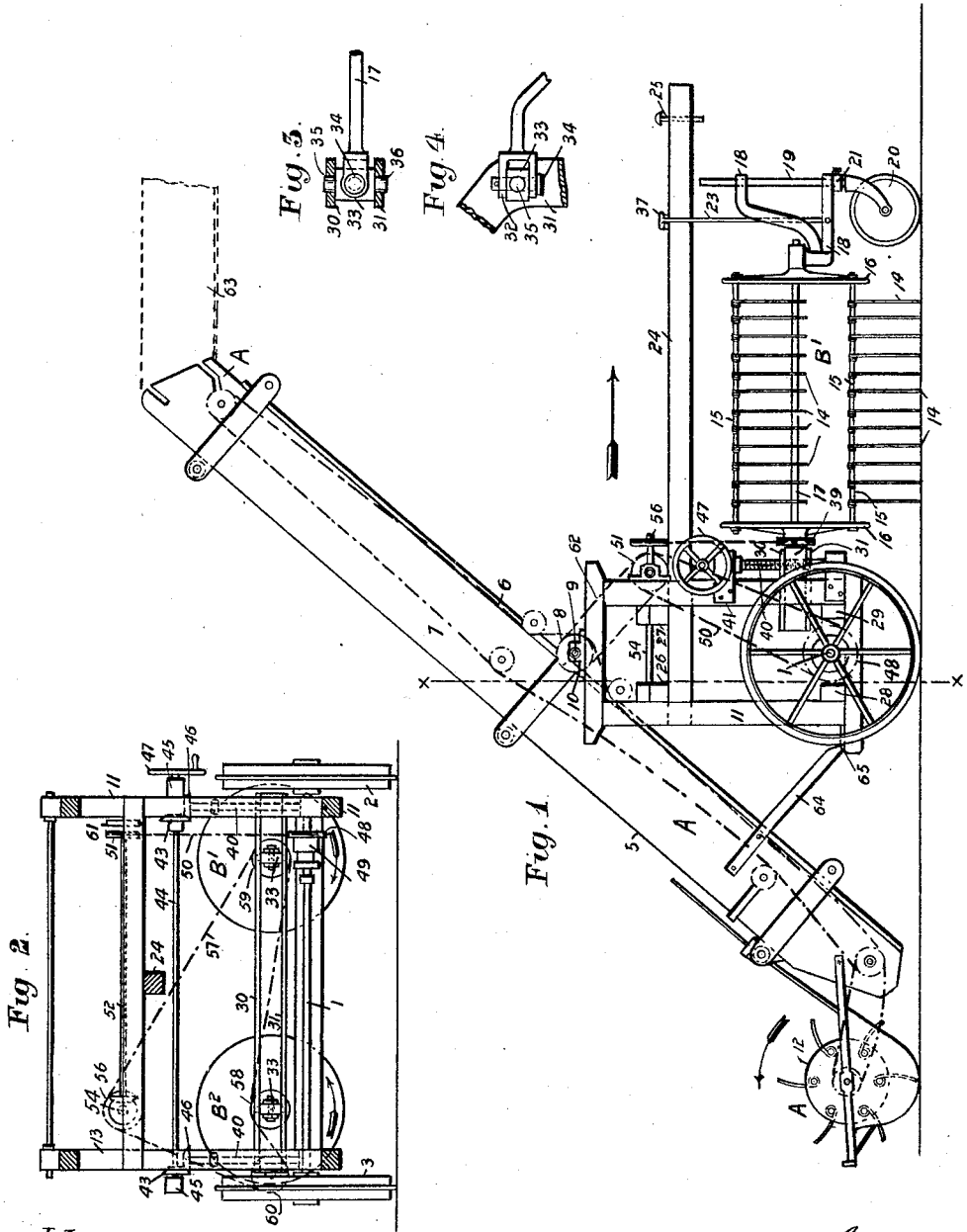

UNITED STATES PATENT OFFICE.

JOSEPH MATTHEW PARRY, OF WESTBURY, LEOMINSTER, ENGLAND.

COMBINED HAY GATHERER AND LOADER.

1,115,732.  Specification of Letters Patent.  Patented Nov. 3, 1914.

Application filed July 17, 1913. Serial No. 779,576.

*To all whom it may concern:*

Be it known that I, JOSEPH MATTHEW PARRY, of Westbury, Leominster, in the county of Hereford, England, a subject of His Majesty the King of Great Britain and Ireland, residing at Westbury, Leominster, in the county of Hereford, England, have invented new and useful Improvements in Combined Hay Gatherers and Loaders, of which the following is a specification.

This invention relates to improvements in combined hay gatherers and loaders by which the three operations of gathering and loading and raking are performed simultaneously as one operation by one implement. Said implement consists of a hay loader of any suitable construction combined with the essential parts of two side delivery rakes arranged so that when the combined machine is connected to and drawn at the back of a wagon on to which the hay is to be loaded, the hay is collected by the side delivery rake portion into what would be a windrow but which, by suitably revolving tines, canvases or the like, is immediately caught and delivered on to the endless canvas or other suitable conveyer of the loader part of the implement and thereby elevated and delivered on to the wagon.

Heretofore it has been proposed for a combined hay gatherer and loader to be drawn behind a wagon so as to collect and deliver hay into the same, said combined hay gatherer and loader comprising an upwardly inclined hay elevator mounted on two road wheels and having in front of and at the sides of it two side delivery rakes of the kind in which the tines are always in a hanging position and are mounted on a series of rods carried by two end disks and are driven by the road wheels, and arranged under the loader so as to collect the hay into a windrow which by the loader is caught and elevated and delivered at the top of the same into the wagon which is connected to the combined machine and drawn in front of the same.

My invention is carried into practice as I will now describe by referring to the accompanying drawings on which—

Figure 1 is a side elevation of a combined hay gatherer and loader constructed in accordance with this invention; Fig. 2 is a cross sectional elevation of part of the same taken on line X X of Fig. 1 but with the loader part omitted; Fig. 3 is a cross sectional elevation on an enlarged scale of the swivel connection of the cranked axle of one of the side delivery rakes to a vertically adjustable horizontal cross bar of the machine frame; Fig. 4 is a plan of the said connection; and Fig. 5 is a part sectional plan of the machine.

In the arrangement of my invention illustrated by my drawings the hay loader part A is combined with two side delivery rakes $B^1$, $B^2$, arranged underneath the inclined bottom part of the hay loader A and in front of the same, as the machine is intended to be fixed at the back part of the wagon collecting the hay and which with the machine is traveling in the direction indicated by the arrow in Fig. 1. The frame of the combined machine is mounted on a cross axle 1 fitted with two road wheels 2, 3, rotary motion and power for driving the loader part A and the side delivery rakes $B^1$, $B^2$, being obtained from the road wheel axle 1 by any convenient arrangement of mechanism as hereinafter described. The hay loader part A can be of any suitable construction and *per se* forms no part of my invention.

The type of hay loader shown on my drawings has an inclined trough of which the two sides are respectively marked 4, 5, and the bottom of the trough is marked 6. This trough carries an endless conveyer which travels up the same and carries the hay from the lower part of the same and delivers it over the top into the wagon, said endless conveyer being driven by any convenient means as by the endless chain 7 which passes over rollers and gears with the sprocket wheel 8 loosely mounted on the side trunnions 9 of the loader, these trunnions being mounted in suitable bearings 10 on the top of the side frames 11, 13, of the combined machine.

12 is the usual tine drum arranged at the bottom of the trough A and slightly behind the same for the purpose of picking up the hay and delivering it to the lower part of the conveyer.

The loader being of the well known kind requires no further description.

The two side delivery rakes $B^1$, $B^2$, are by preference of any suitable revolving type with the tines controlled so that they are always pendant when they revolve. The side delivery rakes shown on my drawings are of a well known type in which the tines 14 are fixed on cranked rods 15 the ends of which are carried by and revolve in bearings in two disks 16 revolving eccentrically in parallel planes and mounted loosely on the cranked axle 17. These cranked axles 17 of the two side delivery rakes are arranged at a convenient distance apart (see Fig. 5) at their ends which are nearer to the road wheels, the cranked axles 17 inclining outwardly toward the front of the machine, that is toward the wagon behind which the machine is drawn and which would be on the right hand side of Figs. 1 and 5, the outer end of each cranked axle 17 being carried by a bracket 18 which supports the vertical spindle 19 of a caster wheel 20, said spindle being furnished with a set screw and collar 21, the position of which can be adjusted on the upright spindle 19 so as to adjust the height of the outer ends of the cranked axles 17 and the distance which the ends of the tines 14 are above the ground. These brackets 18 are stayed at their proper distance apart by any convenient means as by the two stay rods 22, 23, which are connected to the brackets 18 and at their other ends are connected to the center pole 24 of the machine. Said center pole 24 is adapted, as by having a vertical pin 25, for connecting to the back of the wagon on to which the hay is to be loaded, and said center pole is fixed to the machine frame as by being bolted to the cross pieces 26, 27, the ends of which are fixed to the side frames 11, 13, and assist in maintaining the said side frames at their proper distance apart. The lower parts of the side frames 11, 13, are similarly fixed at the proper distance apart by cross pieces 28, 29, bolted thereto.

In addition to the adjustable caster wheels 20 which carry and adjust the height of the outer ends of the cranked axles 17 of the side delivery rakes, the inner ends of the said cranked axles 17 that is the ends which are nearer to the road wheels are adjustable in height so as to adjust the working height of the tines 14 above the ground and also to enable them to be raised entirely clear of the ground when the machine is traveling along a road or part of the field where it is not required to work. This adjustment of the inner ends of the cranked axles is by preference effected by the said inner ends being connected by swivel joints to a horizontal cross bar which can conveniently be formed of two flat section bars 30, 31, fixed together at a short distance apart and one above the other and which stretches across from the side frame 11 to the side frame 13. Each of the cranked axles 17 can have a forked end 32 (see Figs. 3 and 4) which embraces the vertical sides of a swivel piece 33 and is connected thereto by a joint pin 34 so that the axle 17 can swivel vertically on this pin 34. The swivel piece 33 is made with trunnion like top and bottom ends 35, 36, which are mounted in vertical holes in the cross bars 30, 31, so that the axle 17 with the swivel pieces 33 can turn about these trunnions 35, 36, when it is desired to swivel the side delivery rakes nearer together that is parallel or nearly parallel with one another so that the machine will then pass through an ordinary field gateway. Before the said side delivery rakes $B^1$, $B^2$, can be thus swiveled the endless driving chain 57 hereinafter described has to be removed from its sprocket wheels and the connecting tie rods 22, 23, have to be disconnected at 37 from the pole 24. The cross bars 30, 31, are as shown in Fig. 5 cranked into somewhat of a bow shape at 38 so as to be clear of the disks 16 of the side delivery rakes when they are swiveled parallel or nearly parallel with one another as aforesaid.

The combined cross bars 30, 31, with the swivel connections and the side delivery rakes $B^1$, $B^2$, are adjustable vertically up and down the side frames 11, 13, of the machine so as to adjust the height of the tines as aforesaid and thus can conveniently be effected by the ends of the cross bars 30, 31, having tapped blocks 39 fixed between their ends, these tapped blocks forming nuts which are mounted on two vertical screws 40 the ends of which are carried by bearing brackets 41, 42, fixed on the side frames 11, 13, the brackets 41, 42, being fixed at sufficient distance apart, and the screws 40 being made of sufficient length, to allow of the cross bars 30, 31, riding up or down the screws for a sufficient distance. In order to enable both screws 40 to be turned simultaneously so as to raise the ends of both side delivery rakes simultaneously the said screws can conveniently be operated by miter wheels 43 (Fig. 2) fixed on the horizontal shaft 44 which extends across the machine from side to side and is carried by suitable bearings 45 from the side frames, these miter wheels 43 gearing with corresponding miter wheels 46 fixed on the two screws 40. A suitable hand wheel 47 is fixed on the shaft 44 for the purpose of turning it and operating the screws.

The mechanism for imparting rotary motion to the side delivery rakes $B^1$, $B^2$, from the road wheel axle 1 can be arranged in various ways but what I prefer is the arrangement shown on my drawings and particularly by Fig. 2, where on the road wheel axle 1 there is provided a sprocket wheel 48 loosely mounted on the axle and driven through a clutch 49 on the axle operated by a lever not shown on my drawings so that the clutch can, if desired when the machine is traveling along a roadway, or is otherwise being moved and not required to work, be thrown out of gear with the sprocket wheel 48 and the loader and the side delivery rakes will be inoperative. This sprocket wheel 48 drives up through an endless chain 50 on to a sprocket wheel 51 fixed on a counter shaft 52 which is suitably supported in bearings on the machine frame and at the other end of this counter shaft there are beveled wheels 53, which drive a horizontal cross shaft 54 mounted in suitable bearings on the frame. On the other end of this counter shaft 54 is a sprocket wheel 56 which by the endless chain 57 drives on to the sprocket wheels 58, 59, fixed on the disks 16 of the side delivery rakes. It will be seen in Fig. 2 that the endless chain 57 passes from the pinion 56 around an idle wheel 60 and over the top of the sprocket wheel 58 of the side delivery rake B² and under and around the sprocket wheel 59 of the side delivery rake B¹ so as to cause the two side delivery rakes to revolve in opposite directions toward one another as indicated by the arrows in Fig. 2.

The elevator part A is by preference carried on a cross axle 9 forming side trunnions on the top of the side frames 11, 13, of the machine frame immediately above the road wheels 2, 3, so that the elevator conveyer can when desired, that is when traveling along a road, be turned into a substantially horizontal position about its trunnions 9 and fixed in that position for traveling, or otherwise so as to reduce the height of the same when under a shed or the like out of use. On the counter shaft 52 there is a sprocket wheel 61 which by an endless chain 62 drives on to the sprocket wheel 8 on the conveyer cross axle 9 to drive the conveyer and the tine drum 12 at the bottom of the elevator in the usual way.

In order to maintain the elevator part A in its correct position for work as shown in Fig. 1 suitable means are provided such as two side stays 64 which are fixed respectively to the sides 4, 5, of the elevator trough and at their lower ends 65 are removably connected by bolts to the side frames 11, 13 so that they can be unbolted to permit of the elevator part being turned into a horizontal position as aforesaid when required.

When the machine above described is connected as by its pole 24 to the back of the wagon into which the hay is to be delivered, the side delivery rakes B¹, B², revolve toward one another and collect the hay or other crop as aforesaid into what would be a windrow but which by the revolving tines in the tine drum 12 at the bottom of the conveyer is caught and delivered on to the endless conveyer part of the loader and thereby lifted and delivered on to the wagon. It will be understood that if desired or found necessary the upper part of the loader can be extended forward as indicated by dotted lines at 63 in Fig. 1 which is a common construction in other hay loaders.

The accompanying drawings illustrate what I consider to be the best way of carrying my invention into practice but it will be understood that my invention is not limited to the precise details shown as these may be altered to some extent without departing from the nature of my invention.

What I claim as my invention and desire to secure by Letters Patent is:—

1. A combined hay gatherer and loader adapted to be drawn behind a wagon to collect and deliver hay into the wagon, comprising an upwardly inclined hay loader mounted on and driven by two road wheels in combination with two revolving side delivery rakes made with constantly depending tines and driven by the said road wheels and arranged under said loader so as to incline outwardly from the road axle toward the front of the machine, said side delivery rakes having means for adjusting their height above the ground at their inner ends, and for swiveling them to bring their outer ends nearer together, and also having means for fixing their outer ends at the required distance apart for work, substantially as set forth.

2. A combined hay gatherer and loader adapted to be drawn behind a wagon to collect and deliver hay into the wagon, having means at their inner ends for vertically adjusting the height of the cranked axles of the rake tines, comprising in combination side delivery rakes vertically adjustable on the side frames of the machine, cross bars connected to said frame having tapped blocks fixed between the ends of the bars forming nuts, said blocks and nuts being mounted on vertical screws, said screws being carried by brackets on the side frame, and miter or beveled gearing operated by a hand wheel for imparting simultaneous rotation to the screws.

In testimony whereof I have signed my name to this specification in the presence of two subscribing witnesses.

JOSEPH MATTHEW PARRY.

Witnesses:
 CHARLES BOSWORTH KERLEY,
 BERTHA MATILDA DEELEY.